E. P. NEEDHAM,

Assignor of one-half interest to U. PRATT.

Piano and Organ Key.

No. 7,953. Reissued Nov. 13, 1877.

*Witnesses:*
Michael Ryan.
Peter Haynes

*Inventor*
E. P. Needham
by his Attorneys
Brown & Allen

N. PETERS, PHOTO-LITHOGRAPHER, WASHINGTON, D. C.

UNITED STATES PATENT OFFICE.

ELIAS P. NEEDHAM, OF NEW YORK, N. Y., ASSIGNOR OF ONE-HALF INTEREST TO ULYSSES PRATT, OF DEEP RIVER, CONN.

IMPROVEMENT IN PIANO AND ORGAN KEYS.

Specification forming part of Letters Patent No. 140,528, dated July 1, 1873; Reissue No. 7,953, dated November 13, 1877; application filed April 10, 1875.

*To all whom it may concern:*

Be it known that I, ELIAS P. NEEDHAM, of the city, county, and State of New York, have invented a new and useful Improvement in Keys for Piano-Fortes, Organs, and other musical instruments; and I do hereby declare that the following is a full, clear, and exact description thereof, reference being had to the accompanying drawing, forming part of this specification, and in which—

Figure 1:
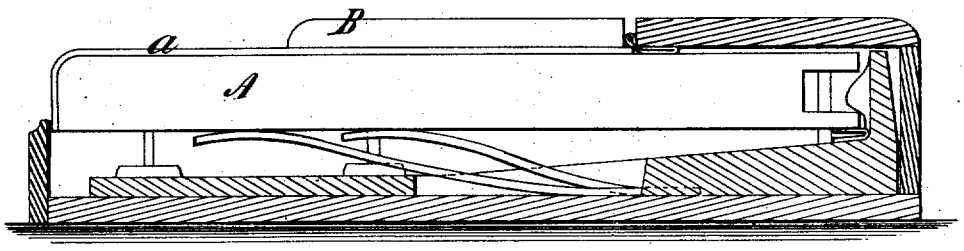
Figure 2:
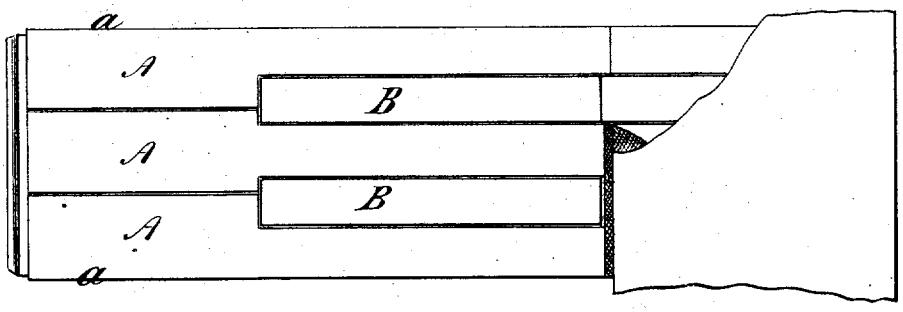

Figure 1 is a vertical longitudinal section of the key-board of a piano-forte or organ having its keys made in accordance with my invention, and Fig. 2 is a top view of the same.

This invention consists in a key for organs, piano-fortes, or other musical instruments, having its upper front edge rounded and covered by a continuous veneer or covering-cap, which extends in one piece along the top and over and along or down the front of the key, and which presents an unbroken rounded surface over such edge, whereby not only is a simple richness of appearance given to the key, but greater facility in performance of certain passages is afforded.

A A represent the natural keys of a piano-forte or organ, and B B the sharp and flat keys thereof. *a a* are the veneers or covering-caps applied to the keys A A. These covering-caps *a a* are made in a single piece, and extend continuously along the tops of the keys, and are bent over and down their front ends, and present an unbroken rounded surface on the upper front edges of the keys.

The appearance of a key-board having the keys thus made has a simple and peculiar style of beauty; and, moreover, owing to the absence of sharp corners at the sides of the front edges, facility is afforded to the performer in some passages, especially in runs and trilling.

When the veneers or covering-caps *a a* are made of elephant ivory, such ivory may, if desirable, be softened, to enable it to be bent over the rounded edges of the keys. Such softening may be effected by soaking it in a solution composed of one part, by weight, of sulphurous acid and ten parts of water.

What I claim as my invention is—

1. A key for organs, piano-fortes, and other musical instruments, having its upper front edge rounded, substantially as herein described.

2. A key for organs, piano-fortes, or other musical instruments, having a veneer or covering-cap which extends in one piece along the top and over or down the front of the key, and which presents an unbroken rounded surface over the upper front edge thereof, essentially as and for the purpose herein set forth.

ELIAS P. NEEDHAM.

Witnesses:

E. STEPHENSON,

GEO. J. S. TAYLOR.